United States Patent
Otsuka et al.

(10) Patent No.: US 6,851,455 B2
(45) Date of Patent: Feb. 8, 2005

(54) STAINLESS STEEL OIL FEEDING PIPE

(75) Inventors: Masato Otsuka, Amagasaki (JP); Hanji Ishikawa, Amagasaki (JP); Satoshi Suzuki, Shin-Nanyo (JP); Toshiro Adachi, Shin-Nanyo (JP)

(73) Assignee: Nisshin Steel Co., Ltd., Tokyo (JP)

( * ) Notice: Subject to any disclaimer, the term of this patent is extended or adjusted under 35 U.S.C. 154(b) by 0 days.

(21) Appl. No.: 10/343,244

(22) PCT Filed: Jul. 26, 2001

(86) PCT No.: PCT/JP01/06423

§ 371 (c)(1), (2), (4) Date: May 16, 2003

(87) PCT Pub. No.: WO02/10631

PCT Pub. Date: Feb. 7, 2002

(65) Prior Publication Data

US 2003/0183292 A1 Oct. 2, 2003

(30) Foreign Application Priority Data

Aug. 1, 2000 (JP) ........................ 2000-233415

(51) Int. Cl.[7] ................................. F16L 9/00
(52) U.S. Cl. .................. 138/171; 138/109; 428/586; 428/685
(58) Field of Search ............... 138/171, 178, 138/109; 428/586, 685

(56) References Cited

U.S. PATENT DOCUMENTS

| | | | | |
|---|---|---|---|---|
| 3,785,787 A | * | 1/1974 | Yokota et al. | 428/638 |
| 3,884,731 A | * | 5/1975 | Barkman et al. | 148/531 |
| 3,910,788 A | * | 10/1975 | Fujioka et al. | 420/45 |
| 4,034,994 A | * | 7/1977 | Ohta et al. | 277/625 |
| 4,134,430 A | * | 1/1979 | Mukasa et al. | 138/109 |
| 4,558,721 A | * | 12/1985 | Trudell et al. | 138/151 |
| 4,609,577 A | * | 9/1986 | Long | 428/683 |
| 4,917,969 A | * | 4/1990 | Pircher et al. | 428/685 |
| 5,458,156 A | * | 10/1995 | Okubo et al. | 138/145 |
| 5,618,355 A | * | 4/1997 | Koyama et al. | 148/320 |
| 6,060,180 A | * | 5/2000 | Ishitsuka et al. | 428/683 |
| 6,070,618 A | * | 6/2000 | Iwabuchi | 138/143 |
| 6,312,834 B1 | * | 11/2001 | Ishio et al. | 428/685 |
| 6,405,761 B1 | * | 6/2002 | Shimizu et al. | 138/109 |
| 6,521,056 B2 | * | 2/2003 | Muraki et al. | 148/325 |
| 6,645,318 B2 | * | 11/2003 | Takahashi et al. | 148/325 |

FOREIGN PATENT DOCUMENTS

| JP | 60 220281 A | 11/1985 |
|---|---|---|
| JP | 04 247851 | 9/1992 |
| JP | 06 041689 | 2/1994 |
| JP | 10 052713 | 2/1998 |

* cited by examiner

*Primary Examiner*—James Hook
(74) *Attorney, Agent, or Firm*—Webb Ziesenheim Logsdon Orkin & Hanson P.C.

(57) ABSTRACT

A fuel-filler tube, which is made of a welded pipe of corrosion-resistant austenitic or ferritic stainless steel, has a fuel-supply opening with high dimensional accuracy. The austenitic stainless steel has hardness of 180 HV or less with a work-hardening coefficient of 0.49 or less. The ferritic stainless steel has Lankford value of 1.2 or more with elongation of 30% or more by a uniaxial tensile test.

2 Claims, 1 Drawing Sheet

STAINLESS STEEL OIL FEEDING PIPE

INDUSTRIAL APPLICATION

The present invention relates to a fuel-filler tube for an automobile, which is made of an expanded stainless steel pipe without cracks so as to reserve fuel without diffusion over a long term.

BACKGROUND OF THE INVENTION

A fuel-filler tube for an automobile has been made of a welded steel pipe, and a fuel-supply opening is formed at its end. The fuel-supply opening is formed by pressing with a punch or bulging process to expand an end of a welded steel pipe, but the steel pipe is often cracked at the formed part. In this consequence, there is a strong demand for provision of a welded steel pipe with good formability.

The fuel-filler tube is installed in an automobile, in the state that it is coupled with a fuel tank. If the fuel-filler tube has poor airtightness, evaporated gasoline diffuses to the open air. Diffusion of gasoline shall be avoided for maintenance of clean atmosphere, but can not be inhibited by use of a conventional fuel-filler tube made of synthetic resin. Another type of a fuel-filler tube, which is made of a plain steel pipe expanded at its end, coated with a chromium layer and further coated with a paint film, is not always protected from corrosion, when it is exposed to a corrosive atmosphere such as a salty area. Corrosion also occurs inside the fuel-filler tube, which is exposed to a corrosive atmosphere containing an organic acid such as denatured gasoline or alcoholic fuel, and causes occurrence of pitting and opened holes in the end. Consequently, the fuel-filler tube drastically looses airtightness.

In order to overcome these disadvantages, applicability of stainless steel, i.e. a representative corrosion-resistant material to a fuel-filler tube, has been researched and examined for maintenance of airtightness over a long term. Stainless steel is well resistant to corrosion without necessity of plating or painting, but hard and easily work-hardened compared with plain steel. Due to the materialistic characteristics, a stainless steel pipe is difficult to form to a predetermined shape without cracks at its expanded part.

By the way, fuel-filler tubes, which are made of an expanded steel pipe with small diameter, are sometime used in response to lightening automobiles. However, a fuel-supply opening is unchanged in size with about 50 mm or so in inner diameter, regardless the size of a steel sheet. Since a steel pipe is necessarily formed at its end with great expansion ratio in this case, excellent formability of steel material is strongly demanded.

However, there is no proposal for provision of a stainless steel pipe, which exhibits good expansibility enough to be formed to a product shape as well as corrosion-resistance necessary for the purpose.

SUMMARY OF THE INVENTION

The present invention aims at provision of a stainless steel fuel-filler tube, which has good corrosion-resistance and has a fuel-supply opening formed with high dimensional accuracy, by selecting a kind of austenitic stainless steel on the basis of hardness and work-hadenability or a kind of ferritic stainless steel on the basis of Lankford value (r-value).

In an austenitic-type fuel-filler tube, an austenitic stainless steel sheet with hardness of 180 HV or less and a work-hardening coefficient (n-value) of 0.49 or less is selected and processed to a pipe In a ferritic-type fuel-filler tube, a ferritic stainless steel sheet with elongation of 30% or more by a uniaxial tensile test and Lankford value of 1.2 or more is selected and processed to a pipe.

BRIEF DESCRIPTION OF THE INVENTION

DETAILED DESCRIPTION OF THE INVENTION

Figure 1:
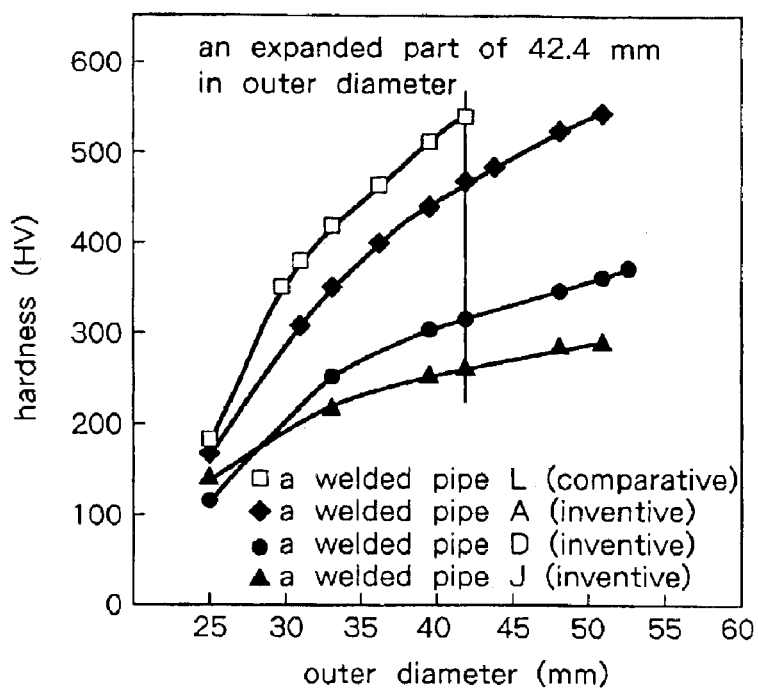
FIG. 1 is a graph showing hardness of an expanded part in every forming step, when an end of a steel pipe is formed to a shape of a fuel-supply opening by a multi-stepped process.

Since a stainless steel is harder material than plain steel, a bigger load is necessary for expanding a welded pipe of stainless steel, and a stainless steel pipe is often buckled as increase of an expansion ratio. The forming load becomes bigger and bigger as advance of steps during a multi-stepped forming process, since stainless steel sheet is easily work-hardened. Although buckling of a stainless steel pipe is avoided by increasing number of forming steps with a small expansion ratio at each step, increase of forming steps complicates a manufacturing process and raises a manufacturing cost. Moreover, when a formed stainless steel pipe is work-hardened above 500 HV, it is hardly plastically deformed any more and easily cracked at its expanded end during the following forming step. Especially, a ferritic stainless steel pipe is often cracked at its expanded end, since its elongation and Lankford value are lower than a plain steel pipe.

The inventors have researched effects of physical properties of a stainless steel sheet used as material for a fuel-filler tube on expanding.

Austenitic stainless steel is the material, which is easily hardened compared with plain steel, due to transformation of matrix to strain-induced martensite caused by plastic deformation. Even if it is soft initially the work-hardened state requires a big forming load in the following work step, and it is often cracked and buckled due to increase of the forming load. The hardening tendency of the austenitic stainless steel sheet originated in generation of strain-induced martensite is represented by a work-hardening coefficient (n-value).

Initial hardness at a high-level means difficult formation of a welded pipe and requires a big forming load. In this case, an expansion ratio is inevitably determined at a low value in order to inhibit buckling of a stainless steel pipe or its sintering with a punch. Since a stainless steel pipe generally has poor ductility as increase of initial hardness, it is easily cracked during forming.

In this point of view, the inventors have investigated hardness and a work-hardening coefficient (n-value) of a starting material for searching a stainless steel sheet suitable for expanding to shape of a fuel-filler tube, and discovered that an austenitic stainless steel sheet with hardness of 180 HV or less and a work-hardening coefficient (n-value) of 0.49 or less is suitable as a starting material for manufacturing a fuel-filler tube with relatively small number of forming steps with a small forming load at each step. The work-hardening coefficient (n-value) is measured by a tensile test as follows: A stainless steel sheet is sampled along its rolling direction, shaped to a test piece No. 13B regulated under JIS Z2201 and tensioned. A curve of true tensile strain with logarithmic elongation is drawn from the test results to calculate a gradient of the curve as a work-hardening coefficient (n-value). As n-value is bigger, a stainless steel is regarded as a material easier to be work-hardened.

On the other hand, ferritic stainless steel is harder with lower elongation than plain steel, due to high Cr content. However, in the case where a pipe is expanded under application of a tensile stress along a circumferential direction and a compression stress along an axial direction, improvement of expansibility can not be expected because of poor ductility of stainless steel.

Lankford value (r-value) is useful for evaluating metal flow along an axial direction with small reduction of thickness. In this regard, the inventors have researched various ferritic stainless steel sheets to be well formed to a product shape, and discovered that a ferritic stainless steel sheet, which has elongation of 30% or more and Lankford value (r-value) of 1.2 or more, is an optimum material to be formed to a predetermined shape having a fuel-supply opening at its end without occurrence of cracks or other defects. Lankford value (r-value) is measured by tensile test as follows: A ferritic stainless steel sheet is sampled along its rolling direction, shaped to a test piece No. 13B regulated under JIS Z2201 and tensioned at a rate of 20 mm/minute. Thickness and width of the test piece are measured after application of 15% tension strain, and natural logarithm of reduction rate of width is divided by natural logarithm of reduction rate of thickness to calculate a quotient regarded as Lankford value (r-value). Furthermore, the test pieces are tensioned until fracture, and the fractured parts are butted together to measure elongation between predetermined marks. The measured elongation is regarded as fracture elongation.

When an austenitic stainless steel sheet with hardness of 180 HV or less and a work-hardening coefficient (n-value) of 0.49 or less is used as a material for a fuel-filler tube, it can be formed with high expansibility. Therefore, a welded steel pipe, even which is small in size, can be expanded to a product shape having a fuel-supply opening with a predetermined size. When a ferritic stainless steel sheet with elongation of 30% or more and Lankford value (r-value) of 1.2 or more is used as a material for a fuel-filler tube, it is also expanded to a product shape having a fuel-supply opening with a predetermined size. The welded pipe is manufactured from any of the stainless steel sheets by sizing the stainless steel sheet to predetermined width, forming the sized sheet to a cylindrical shape, and arc-, laser- or resistance-welding both sides of the sheet together. A seamless pipe is also expanded to a fuel-filler tube having a fuel-supply opening at its end, as far as its hardness and work-hardening coefficient (n-value) are less than 180 HV and 0.49, respectively.

The other features of the present invention will be more apparent from the following examples with the drawings, although the examples do not limit scope of the present invention.

EXAMPLE 1

Welded pipes of 25.4 mm in outer diameter, 0.5 mm in thickness and 350 mm in length were manufactured from several stainless steel sheets shown in Table 1. An expanded part of 51.4 mm in outer diameter was formed at an end of each welded pipe by repetition of expanding, in order to research effects of hardness and a work-hardening coefficient (n-value) on formability of the welded pipe.

A welded pipe L was easily buckled during expanding, since it was hard (185 HV) with a large work-hardening coefficient of 0.52. Its forming process was necessarily divided to many steps with a small expansion ratio, but an outer diameter of the expanded part was 42.4 mm at most. Another welded pipe M of a ferritic stainless steel was formed with a large reduction of thickness, since it had poor ductility with elongation of 28% and Lankford value of 1.16. Therefore, its expansion ratio without cracks was 42.4 mm at most.

On the other hand, any welded pipe, which was made of a austenitic stainless steel with controlled hardness and work-hardening coefficient, was expanded to an outer diameter of 51.4 mm (in other words, a sufficient inner diameter for a fuel-supply opening) at its end. Especially, a welded pipe of a Cr—Ni austenitic stainless steel containing Cu was formed to an objective outer diameter in five steps, and also formed to 53.0 mm in outer diameter without cracks. Welded pipes of ferritic stainless steels with controlled elongation and Lankford value were also formed to an outer diameter of 51.4 mm without cracks.

TABLE 1

Stainless Steels Used In Example 1 With Properties

| Note | | Inventive Examples | | | | | | | | | | Comparative Examples | |
|---|---|---|---|---|---|---|---|---|---|---|---|---|---|
| Kind Of Welded Pipe | | A | B | C | D | E | F | G | H | I | J | K | L | M |
| Alloying Elements (mass %) | C | 0.06 | 0.02 | 0.05 | 0.01 | 0.01 | 0.03 | 0.03 | 0.01 | 0.02 | 0.01 | 0.01 | 0.06 | 0.01 |
| | Si | 0.6 | 0.4 | 0.6 | 0.3 | 0.3 | 0.3 | 0.4 | 0.2 | 0.56 | 0.04 | 0.2 | 2.5 | 0.2 |
| | Mn | 1.3 | 1.4 | 1.0 | 1.6 | 1.5 | 1.4 | 0.3 | 0.2 | 0.2 | 0.2 | 0.2 | 0.8 | 0.2 |
| | Ni | 8.5 | 9.1 | 10.1 | 7.9 | 12.0 | 4.67 | — | — | — | — | — | 9.4 | — |

TABLE 1-continued

Stainless Steels Used In Example 1 With Properties

| Note | | Inventive Examples | | | | | | | | | | Comparative Examples | |
|---|---|---|---|---|---|---|---|---|---|---|---|---|---|
| Kind Of Welded Pipe | A | B | C | D | E | F | G | H | I | J | K | L | M |
| Cr | 18.2 | 18.7 | 17.0 | 16.9 | 17.1 | 16.8 | 16.5 | 18.0 | 19.2 | 18.9 | 22.1 | 17.8 | 30.2 |
| Cu | — | — | — | 3.2 | 2.0 | 3.82 | — | — | 0.5 | 0.5 | — | — | — |
| Mo | — | — | 2.1 | — | — | — | — | 1.0 | — | — | 1.2 | — | 2.1 |
| Ti | — | — | — | — | — | — | 0.3 | 0.3 | — | — | 0.2 | — | 0.2 |
| Nb | — | — | — | — | — | — | — | — | 0.5 | 0.5 | 0.2 | — | 0.2 |
| Mechanical Properties | | | | | | | | | | | | | |
| 0.2% Yield Strength (N/mm$^2$) | 284 | 270 | 314 | 188 | 176 | 241 | 285 | 270 | 360 | 274 | 343 | 285 | 431 |
| Tensile Strength (N/mm$^2$) | 659 | 570 | 578 | 479 | 476 | 529 | 480 | 440 | 530 | 444 | 510 | 710 | 568 |
| Elongation (%) | 60 | 60 | 55 | 61 | 55 | 54 | 32 | 34 | 31 | 34 | 30 | 64 | 28 |
| Hardness HV | 160 | 154 | 156 | 119 | 109 | 127 | 154 | 144 | 177 | 139 | 166 | 185 | 192 |
| n-value | 0.49 | 0.48 | 0.49 | 0.41 | 0.38 | 0.43 | 0.23 | 0.22 | 0.20 | 0.21 | 0.18 | 0.52 | 0.23 |
| r-value | — | — | — | — | — | — | 1.8 | 1.25 | 1.76 | 1.84 | 1.31 | — | 1.16 |

TABLE 2

Occurrence Of Cracks And Reduction Of Thickness At Every Forming Step

| Note Kind Of Welded Pipe | | | | | | | | | | | | | | | |
|---|---|---|---|---|---|---|---|---|---|---|---|---|---|---|---|
| Forming Step | Outer diameter of formed part | Evaluation | Inventive Examples | | | | | | | | | | | Comparative Examples | |
| | | | A | B | C | D | E | F | G | H | I | J | K | L | M |
| 1$^{st}$ | 30.0 mm | (1) | — | — | — | — | — | — | — | — | — | — | — | ○ | — |
| | | (2) | | | | | | | | | | | | | |
| 2$^{nd}$ | 31.2 mm | (1) | ○ | ○ | ○ | — | — | — | ○ | — | ○ | — | ○ | ○ | ○ |
| | | (2) | | | | | | | | | | | | | |
| 3$^{rd}$ | 33.4 mm | (1) | ○ | ○ | ○ | ○ | ○ | ○ | ○ | ○ | ○ | ○ | ○ | ○ | ○ |
| | | (2) | 10.4 | 10.2 | 10.6 | 8.0 | 7.2 | 8.5 | 5.7 | 5.3 | 6.2 | 5.1 | 7.9 | 11.1 | 8.7 |
| 4$^{th}$ | 36.5 mm | (1) | ○ | ○ | ○ | — | — | — | — | — | — | — | — | ○ | — |
| | | (2) | | | | | | | | | | | | | |
| 5$^{th}$ | 40.0 mm | (1) | ○ | ○ | ○ | ○ | ○ | ○ | ○ | ○ | ○ | ○ | ○ | ○ | ○ |
| | | (2) | | | | | | | | | | | | | |
| 6$^{th}$ | 42.4 mm | (1) | ○ | ○ | ○ | ○ | ○ | ○ | ○ | ○ | ○ | ○ | ○ | ○ | ○ |
| | | (2) | 18.2 | 17.5 | 17.8 | 13.7 | 12.0 | 14.2 | 11.9 | 11.7 | 12.0 | 11.2 | 13.2 | 21.2 | 18.7 |
| 7$^{th}$ | 44.0 mm | (1) | ○ | ○ | ○ | — | — | — | — | — | — | — | — | X | X |
| | | (2) | | | | | | | | | | | | | |
| 8$^{th}$ | 48.5 mm | (1) | ○ | ○ | ○ | ○ | ○ | ○ | ○ | ○ | ○ | ○ | ○ | | |
| | | (2) | | | | | | | | | | | | | |
| 9$^{th}$ | 51.4 mm | (1) | ○ | ○ | ○ | ○ | ○ | ○ | ○ | ○ | ○ | ○ | ○ | | |
| | | (2) | 24.2 | 23.2 | 23.7 | 19.1 | 18.1 | 18.7 | 20.3 | 19.8 | 20.6 | 19.3 | 21.5 | | |
| 10$^{th}$ | 53.0 mm | (1) | X | X | X | ○ | ○ | ○ | X | X | X | X | X | | |
| | | (2) | | | | | | | | | | | | | |

Evaluation (1): Absence (○) or presence (X) of cracks
Evaluation (2): reduction of thickness (%)

Sectional hardness of an expanded part of each welded pipe was measured at every forming step, so as to research change of hardness in advance of forming steps. Results are shown in FIG. 1. It is noted that a welded pipe L was excessively hardened up to 550 HV when its end was expanded to 42.4 mm in outer diameter.

On the other hand, welded pipes A and D were slightly hardened to 460 HV and 315 HV, respectively, although they were made of the same type of austenitic stainless steel. These results prove that the austenitic stainless steels for the welded pipes A and D were materials hardly work-hardened. Another welded pipe J of a ferritic stainless steel was softer in a expanded state compared with austenitic stainless steel, since its work-hardening coefficient was low of 0.21.

Furthermore, a high-frequency welded pipe of 25.4 mm in outer diameter, 1.0 mm in thickness and 350 mm in length was expanded to an outer diameter of 52.4 mm at its end in three steps shown in Table 3. A welded pipe, which as made of any stainless steel with hardness and a work-hardening coefficient controlled according to the present invention, was expanded to an outer diameter of 52.4 mm without cracks or buckling. Reduction of thickness was small enough to use as a fuel-supply opening with good properties. But, welded pipes L and M were ruptured at their ends during the third step.

TABLE 3

Occurrence Of Cracks And Reduction Of Thickness At Every Forming Step

| Forming Step | Note Kind of welded pipe Outer diameter of formed Part | Evaluation | Inventive Examples | | | | | | | | | | | Comparative Examples | |
|---|---|---|---|---|---|---|---|---|---|---|---|---|---|---|---|
| | | | A | B | C | D | E | F | G | H | I | J | K | L | M |
| 1st | 34.4 mm | (1) | ○ | ○ | ○ | ○ | ○ | ○ | ○ | ○ | ○ | ○ | ○ | ○ | ○ |
| | | (2) | 10.6 | 10.4 | 11.0 | 9.0 | 8.1 | 9.4 | 7.8 | 7.5 | 8.1 | 7.4 | 8.5 | 12.1 | 9.5 |
| 2nd | 43.4 mm | (1) | ○ | ○ | ○ | ○ | ○ | ○ | ○ | ○ | ○ | ○ | ○ | ○ | ○ |
| | | (2) | 18.8 | 18.2 | 18.5 | 15.8 | 13.9 | 16.2 | 14.0 | 13.9 | 14.1 | 13.2 | 15.6 | 22.3 | 19.8 |
| 3rd | 52.4 mm | (1) | ○ | ○ | ○ | ○ | ○ | ○ | ○ | ○ | ○ | ○ | ○ | X | X |
| | | (2) | 25.1 | 24.1 | 24.3 | 20.5 | 19.8 | 21.1 | 21.5 | 20.3 | 21.9 | 20.1 | 22.3 | | |

Evaluation (1): Absence (○) or presence (X) of cracks
Evaluation (2): reduction of thickness (%)

Figure 2:
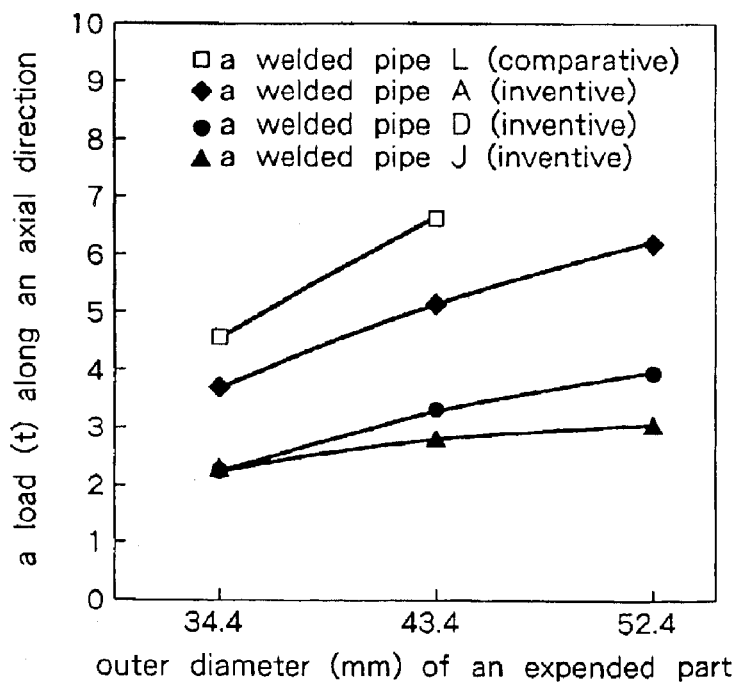
FIG. 2 is a graph showing change of a load applied to a steel pipe along an axial direction in every forming step.

Furthermore, a load applied to each welded pipe along its axial direction was measured at every forming step. Results shown in FIG. 2 prove that a load applied to the welded pipe, which was made of an austenitic stainless steel defined by the present invention, was relatively small. When an expanded part of a welded pipe J made of a ferritic stainless steel hardly work-hardened was further formed, a load applied along an axial direction was held at a lower level compared with austenitic stainless steel. Decrease of the load means suppression of heat generated during forming and inhibits sintering a welded pipe with a punch. As a result, a lifetime of a punch was prolonged, and the welded pipe was also formed to a product shape having an inner surface free from defects.

INDUSTRIAL ADVANTAGES OF THE INVENTION

The fuel-filler tube according to the present invention as above-mentioned is made from a welded pipe of an austenitic stainless steel sheet with hardness of 180 HV or less and a work-hardening coefficient (n-value) of 0.49 or less or a ferritic stainless steel with elongation of 30% or more by a uniaxial tensile test and Lankford value (r-value) of 1.2 or more. Since the welded pipe can be expanded to a product shape having an expanded fuel-supply opening at its end without cracks or buckling even under severe conditions. A welded pipe of small diameter can be also formed to a product shape having a fuel-supply opening at its end with high dimensional accuracy, with high expansion ratio. Consequently, a fuel-filler tube in small size is provided as a lightened corrosion-resistance part for an automobile.

What is claimed is:

1. An austenitic stainless steel fuel-filler tube having a fuel supply end with an exnanded portion made from a pipe of an austenitic stainless steel with hardness of 180 HV or less and a work-hardening coefficient (n-value) of 0.49 or less, said expanded portion formed by multiple punch pressing steps.

2. A ferritic stainless steel fuel-filler tube having a fuel supply end with an expanded portion made from a pipe of ferritic stainless steel with elongation of 30% or more by a uniaxial tensile test and Lankford value (r-value) of 1.2 or more said expanded portion formed by multiple punch pressing steps.

* * * * *

UNITED STATES PATENT AND TRADEMARK OFFICE
CERTIFICATE OF CORRECTION

PATENT NO. : 6,851,455 B2
DATED : February 8, 2005
INVENTOR(S) : Otsuka et al.

It is certified that error appears in the above-identified patent and that said Letters Patent is hereby corrected as shown below:

Column 8,
Line 31, "an exnanded portion" should read -- an expanded portion --.

Signed and Sealed this

Twenty-third Day of August, 2005

JON W. DUDAS
*Director of the United States Patent and Trademark Office*